United States Patent
Welsch et al.

(10) Patent No.: US 11,361,736 B2
(45) Date of Patent: Jun. 14, 2022

(54) METHODS AND SYSTEMS FOR ENERGY OR RESOURCE MANAGEMENT OF A HUMAN-MACHINE INTERFACE

(71) Applicant: Aptiv Technologies Limited, St. Michael (BB)

(72) Inventors: Tim Welsch, Neustadt (DE); Roland Hollemann, Seesen (DE)

(73) Assignee: Aptiv Technologies Limited, St. Michael (BB)

(*) Notice: Subject to any disclaimer, the term of this patent is extended or adjusted under 35 U.S.C. 154(b) by 0 days.

(21) Appl. No.: 17/014,865

(22) Filed: Sep. 8, 2020

(65) Prior Publication Data
US 2021/0097960 A1    Apr. 1, 2021

(30) Foreign Application Priority Data
Sep. 26, 2019 (EP) .................. 19199890

(51) Int. Cl.
G09G 5/373  (2006.01)
G06F 1/28   (2006.01)
G06F 1/3231 (2019.01)
G06F 3/16   (2006.01)

(52) U.S. Cl.
CPC ........... *G09G 5/373* (2013.01); *G06F 1/28* (2013.01); *G06F 1/3231* (2013.01); *G06F 3/165* (2013.01); *G09G 2320/0626* (2013.01); *G09G 2330/023* (2013.01); *G09G 2340/0407* (2013.01); *G09G 2354/00* (2013.01)

(58) Field of Classification Search
CPC .......... G09G 5/373; G09G 2320/0626; G09G 2330/023; G09G 2340/0407; G09G 2354/00; G06F 1/28; G06F 1/3231; G06F 3/165; G06F 1/3218; G06F 1/3265; G06F 3/013; G06F 3/011; G06F 3/012; Y02D 10/00
See application file for complete search history.

(56) References Cited

U.S. PATENT DOCUMENTS

| 9,915,996  | B2  | 3/2018 | Noro  |            |
|------------|-----|--------|-------|------------|
| 10,042,170 | B2  | 8/2018 | Irzyk |            |
| 10,419,655 | B2* | 9/2019 | Sivan | H04W 4/80  |
| 10,594,916 | B2* | 3/2020 | Sivan | G06F 3/012 |

(Continued)

FOREIGN PATENT DOCUMENTS

| KR | 101359660  | 2/2014 |
| WO | 2018017751 | 1/2018 |
| WO | 2018115958 | 6/2018 |

OTHER PUBLICATIONS

"Extended European Search Report", EP Application No. 19199890. 5, dated Feb. 19, 2020, 8 pages.

*Primary Examiner* — Vijay Shankar
(74) *Attorney, Agent, or Firm* — Sawtooth Patent Group PLLC

(57) ABSTRACT

A computer implemented method for energy or resource management of a human-machine interface comprises the following steps carried out by computer hardware components of the human-machine interface: determining a level of attention of a user of the human-machine interface to the human-machine interface; and setting an energy and/or resource utilization related setting of the human-machine interface based on the determined level of attention.

20 Claims, 4 Drawing Sheets

(56) References Cited

U.S. PATENT DOCUMENTS

Figure 1:
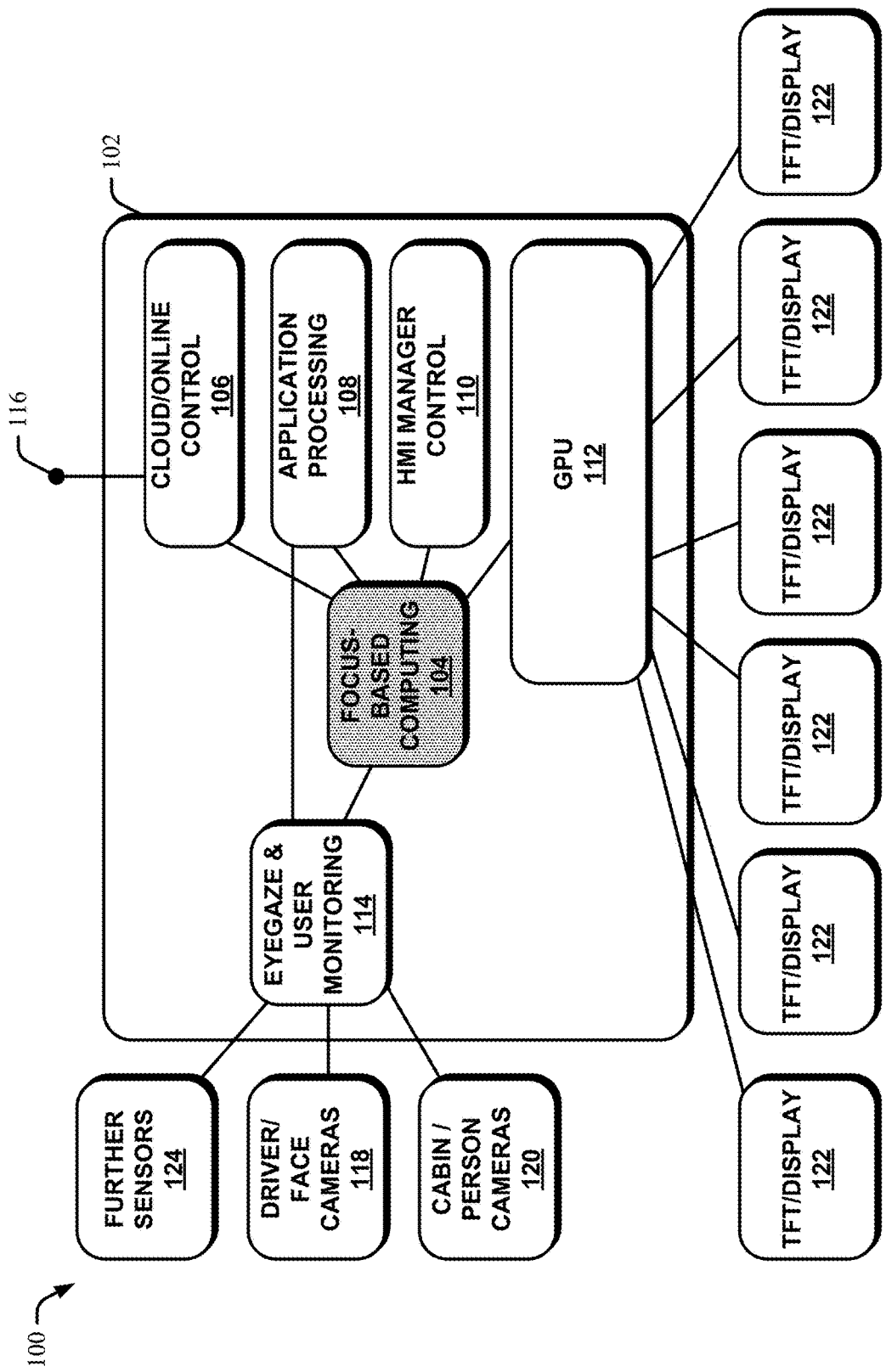

| | | |
|---|---|---|
| 11,019,246 B2 * | 5/2021 | Sivan ..................... G06F 1/163 |
| 2015/0058647 A1 | 2/2015 | Noro |
| 2015/0102996 A1 | 4/2015 | Yim et al. |
| 2015/0293585 A1 | 10/2015 | Seok et al. |
| 2016/0180801 A1 | 5/2016 | Lee et al. |
| 2019/0182415 A1 * | 6/2019 | Sivan ..................... G06F 1/163 |
| 2019/0324518 A1 | 10/2019 | Jiao |
| 2021/0229707 A1 * | 7/2021 | Akash ..................... G06F 3/013 |

* cited by examiner

METHODS AND SYSTEMS FOR ENERGY OR RESOURCE MANAGEMENT OF A HUMAN-MACHINE INTERFACE

CROSS-REFERENCE TO RELATED APPLICATION

This application claims priority to European Patent Application Number 19199890.5, filed Sep. 26, 2019, the disclosure of which is hereby incorporated by reference in its entirety herein.

FIELD

The present disclosure relates to energy and/or resource management, for example energy and/or resource management of human-machine interface, for example of a vehicle or point of sale or video device or home automation device.

BACKGROUND

Electric power in various devices, for example vehicles, is a limited resource, which is more cumbersome to refill than fossil fuel. For example, while a car may be refueled with gasoline or diesel in a view seconds, charging of an electric vehicle takes in the order of hours. Furthermore, while fuel stations for gasoline or diesel are available virtually anywhere, charging of electric vehicles may require specific charging infrastructure which is not widely available.

Furthermore, current drawbacks are not only related to the energy use, but total system (depreciation) cost may be driven at least to a similar amount by hardware resource cost. There are more and more high resolution displays, and driving them all the time with highest graphics capability may consume a high amount of energy and may utilize high hardware resources (for example memory bandwidth of CPU (central processing unit), GPU (graphics processing unit), and RAM (random access memory) data throughput), which is a reasonable cost factor of computing systems. To summarize, we see increasing cost for CPU, GPU, connectivity bandwidth and the system's energy consumption.

Accordingly, there is a need for methods and systems which reduce consumption of electric energy and/or computing and graphics processing.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for energy and/or resource management of a human-machine interface, the method comprising the following steps performed (in other words: carried out) by computer hardware components of the human-machine interface: determining a level of attention of a user of the human-machine interface to the human-machine interface; and setting an energy and/or resource utilization related setting of the human-machine interface based on the determined level of attention.

In other words, a setting of the human-machine interface (for example a graphics display) may be set (for example to a setting of reduced energy consumption or of reduced utilization of resources, for example hardware resources) if a certain level of attention (for example low attention or for example attention below a pre-determined threshold) to the human-machine interface is determined for a user (for example a driver or a passenger of a vehicle, for example car, truck, airplane or any other vehicle that uses electricity for powering a human-machine interface).

The energy and/or resource utilization related setting may be a setting related to use of energy and/or utilization of resources of the human-machine interface.

The human-machine interface may be a human-machine interface of a vehicle or of a point of sale or of a video device or of a home automation device.

For example, where the human machine interface is the human-machine interface of a vehicle, the user may be an occupant of the vehicle, for example a passenger or driver.

For example, a lower level of attention may result in an energy and/or resource utilization related setting of lower energy consumption or lower resource utilization, while a higher level of attention may result in an energy and/or resource utilization related setting of higher energy consumption or higher resource utilization. In other words, the setting may be so that energy-consumption is reduced with reduced level of attention. Thus, total system (depreciation) cost and hardware resource cost may be reduced. For example, the cost (for example related to hardware utilization) of CPU and/or GPU and/or a connectivity bandwidth and the system's power consumption may be reduced. Also, the physical hardware may be reduced.

The level of attention may be expressed as a probability or proportion, for example a real number between 0 and 1 (or between 0% and 100%). In another example, the level of attention may be expressed by a fuzzy representation, for example with probability levels of "most probably not", "maybe not", "maybe", "most probably yes", or any other representation suitable for indicating a probability. In another example, the level of attention may be binary (for example "attentive" or "not attentive"). It will be understood that the energy and/or resource utilization related setting may also be binary (for example "on" or "off") or non-binary (for example set a certain setting to a certain percentage, for example brightness may be set to 30% of maximum brightness for a non-attentive user, or to 100% of maximum brightness for an attentive user).

The vehicle may be a car, a truck, an airplane, or any other vehicle that makes use of electric energy to power a human-machine interface. The occupant may be the operator of the vehicle (for example the driver of the car), or a passenger (in other words: another occupant different from the operator). The human-machine interface may be a graphics display, a speaker, a tactile output, or a tactile input, or any other devices or units which may be used for receiving information from a computing system or for providing information to the computing system. The human-machine interface may be related to controlling the vehicle (for example driving the vehicle (for example a display of a current speed or navigation instruction) or for example controlling an autonomous vehicle (for example a display of a setting of the autonomous vehicle, for example for a desired level of comfort of the damping system of the autonomous vehicle). The human-machine interface may also be related to other contents than driving related contents, for example the human-machine interface may be an interface for controlling an air conditioning, of for showing a movie to the occupants of the vehicle.

According to another aspect, the computer-implemented method further comprises the following step carried out by the computer hardware components: determining a focus point of the user; wherein the level of attention is determined based on the focus point. For example, the level of attention may be determined based on how close the focus point is to a center of the human-machine interface (for example graphics display), or based on how long the focus point rests on the human-machine interface, and/or based on whether there are changes to the focus point within the human-machine interface.

According to another aspect, the focus point is determined based on at least one of: a pose of the user's head; or a pose of at least one of the user's eyes.

A pose may include a position (as a two-dimensional position in a plane or a three-dimensional position in space) and/or a direction (as a one-dimensional direction, a two-dimensional direction, or a three-dimensional direction). Based on the pose of the head or of the eye(s), it may be possible to estimate to where the user's gaze is directed, and thus, a level of attention may be determined based on this estimate.

According to another aspect, the computer-implemented method further comprises the following step carried out by the computer hardware components: determining a level of drowsiness of the user. For example, the level of drowsiness may be determined based on at least one of: a movement of the user; an eye movement of the user; or a reaction time of the user. The level of attention is determined based on the level of drowsiness. For example, if it is determined that the user is drowsy or tired, a graphics display (which may be the human-machine interface or which may be included in the human-machine interface) may fade out (for example may continuously decrease brightness over a pre-determined period of time), and may then completely turn off. Alternatively, the user may be prompted for input in order to avoid that the graphics display turns off. If the user does not provide input, the display may fade out and may then completely turn off.

According to another aspect, the energy and/or resource utilization related setting comprises a frame rate of a graphics display (which may be the human-machine interface or which may be included in the human-machine interface). By reducing the frame rate (in other words: temporal resolution), the energy consumption of the graphics display itself may be reduced, and furthermore the energy consumption of the units that provide the content to be display may be reduced, because these units can determine the content at a lower frequency (in other words: less often).

According to another aspect, the energy and/or resource utilization related setting comprises a pixel resolution on which a graphics processing unit provides a frame to be displayed on a graphics display (which may be the human-machine interface or which may be included in the human-machine interface). By reducing the pixel resolution (in other words: spatial resolution), the performance or energy consumption of the graphics display itself may be reduced, and furthermore the energy consumption of the units that provide the content to be display may be reduced, because these units can determine a lower resolution content.

According to another aspect, the energy and/or resource utilization related setting comprises an intensity of a backlight illumination of a graphics display (which may be the human-machine interface or which may be included in the human-machine interface). Reducing the intensity of a backlight illumination may reduce the energy consumption of the graphics display. Optionally, the brightness of the video signal (for example picture or movie) is increased, to compensate the lower light power in the display and generate to the viewer an identical brightness perception from the screen but with reduced contrast.

According to another aspect, the energy and/or resource utilization related setting is related to a pre-processing of data to be displayed on a graphics display (which may be the human-machine interface or which may be included in the human-machine interface). For example, the data to be displayed may be pre-processed with a computationally less expensive (and thus less energy consuming) method. For example, graphical animations of content to be displayed may be done on a less energy consuming level, for example for illustrating a turning instruction on a navigation system.

According to another aspect, the energy and/or resource utilization related setting is related to acquiring data to be displayed on a graphic display (which may be the human-machine interface or which may be included in the human-machine interface). For example, if an user's attention to a graphics display is below a pre-determined threshold, the data to be displayed may be acquired at a reduced rate (in other words: less often or in lower resolution or in form of shorter video clips repeating themselves (i.e. for rolling movies)), or some data may not be acquired at all and the portion of the graphics display which usually (for example in a situation where the user is attentive to the graphics display) would display the data may be left blank. This may reduce the energy consumption for acquiring the data.

According to another aspect, the energy and/or resource utilization related setting comprises an off state. For example, a graphics display (which may be the human-machine interface or which may be included in the human-machine interface) may be switched off in a situation where the level of attention is below a pre-determined threshold. Once the graphics display is switched off, the graphics processing unit related to the graphics device may also be switched off or may be set to a sleep mode or to a mode of reduced activity. Furthermore, once the graphics display is switched off also the components (in other words: units) of the computing system which acquire the data to be displayed on the graphics display (for example sensors or communication units) may be switched off or may be set to a sleep mode or to a mode of reduced activity.

According to another aspect, the energy and/or resource utilization related setting is set based on a status of a battery of the human-machine interface. For example, if the human-machine interface an electric vehicle is on low battery (for example because the electric vehicle in which the human-machine interface is provided is on low battery), the energy and/or resource utilization related setting may be set to a low power consumption setting as soon as the level of attention is below a first pre-determined threshold, while, if the battery of the electric vehicle is charged to an amount more than a pre-determined amount, the energy and/or resource utilization related setting may be set to a low power consumption setting only if the level of attention falls below a second threshold which is below the first threshold.

According to another aspect, the energy and/or resource utilization related setting comprises an audio-setting of an audio system. The audio-setting may include loudness, equalizer settings, or any other settings that may influence the energy consumption of the audio system. The audio-setting may be an audio-setting for all speakers in a vehicle, or only for a selected subset of the speakers of the car (for example the speakers closest (or in another example most remote) to an occupant of the vehicle), or for speakers related to (for example being a part of) the human-machine interface.

According to another aspect, the energy and/or resource utilization related setting comprises the handling of spatially big displays (e.g. advertising video walls), where usually a user who is close to the display only perceives a certain area part of the display and not the full display area. Utilizing all above mentioned settings may then apply also for a certain area of the display surface to control brightness and graphics processing and content computing.

According to another aspect, the energy and/or resource utilization related setting comprises the handling of multi user scenarios. By identifying all areas that are in focus of the multiple users, for example also with different user attention, a balanced setting for all areas and displays can be determined and applied to the HMI system, utilizing all above mentioned methods.

According to another aspect, daisy-chain video links may be used to get multiple displays connected with less harness (but with limited bandwidth). Methods according to various embodiments may be used to achieve the best perception result on a given bandwidth-display constraint in a days-chain system.

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

The computer system may comprise a neuronal net processing architecture in combination with machine learning. This neuronal net then may use the available sensor data and the knowledge of the HMI system status and capabilities, and the current policies to compute the user's focus and attention situation within its neuronal nodes and generate as output the needed settings related to energy and/or resource utilization.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
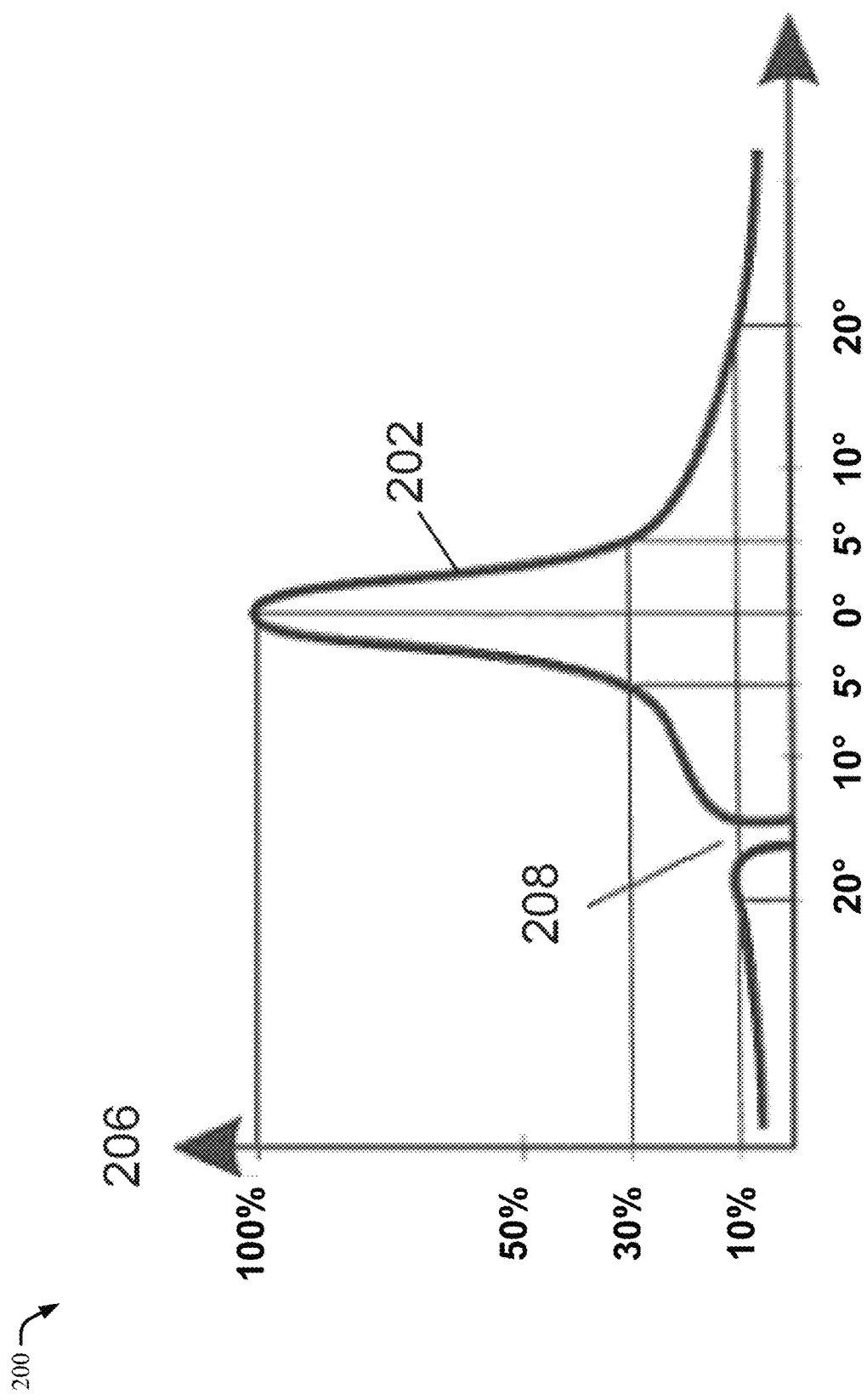
Figure 3:
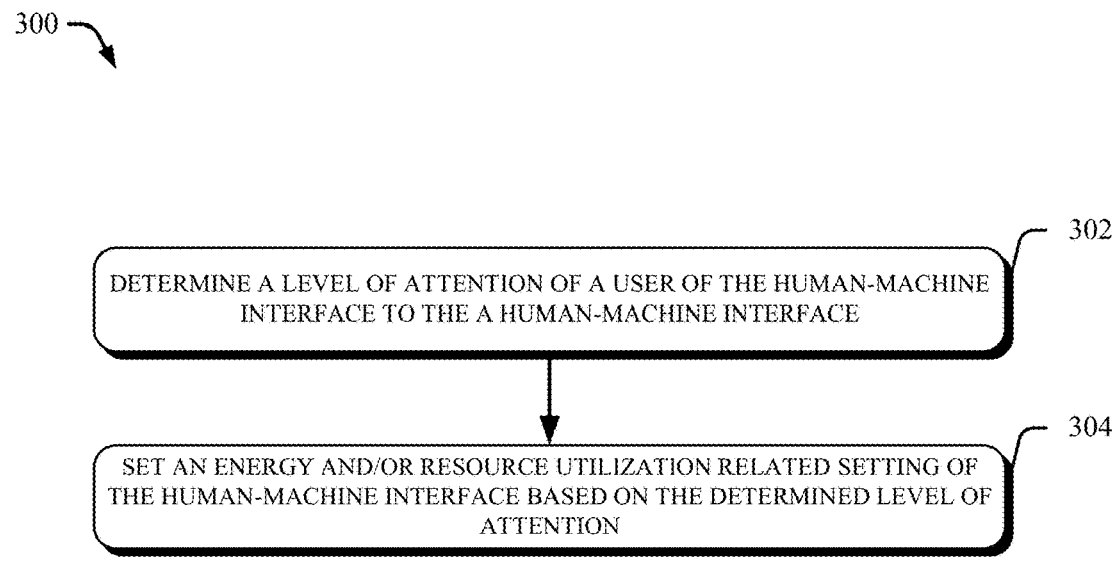
Figure 4:
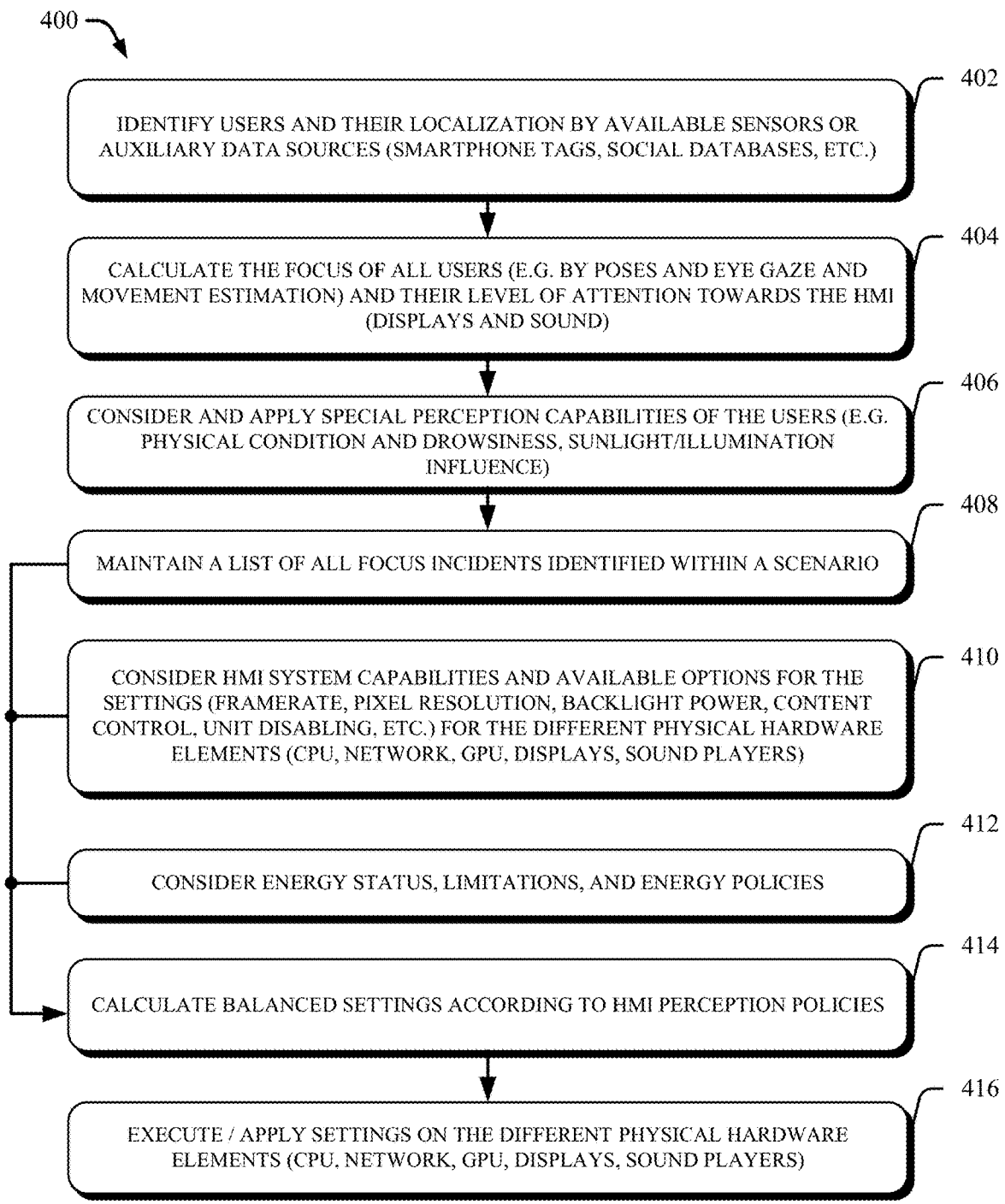

Exemplary embodiments and functions of the present disclosure are described herein in conjunction with the following drawings, showing schematically:

FIG. 1 a computing system according to various embodiments;

FIG. 2 an eye visus/focus diagram;

FIG. 3 a flow diagram illustrating a computer-implemented method for energy and/or resource management of a human-machine interface according to various embodiments; and FIG. 4 a flow diagram illustrating a method according to an embodiment.

DETAILED DESCRIPTION

According to various embodiments, methods and systems may be provided which reduce overall computing resources and/or data traffic/transmission and/or consumption of electric energy, for example in vehicles or point of sale devices or video devices or home automation devices. For example, methods and devices for focusing and reducing of computing power on HMI (human machine interface) based computing systems may be provided.

For HMIs, a high number of graphics screens may be used and a large graphical performance may be used to create best possible user experience. For example, a high number of pixels, a fast graphics engine, fast applications and fast application response times, and high quality optical parameters like display contrast may be used. For example, HMIs for machinery and vehicles, for example cockpit and cabin infotainment systems, may drive a plurality of screens, for example four to eight screens, simultaneously, or may use very large screens and augmented reality mappings.

Creating premium user experience for HMI may require a considerable amount of electric resources. To guarantee a minimum frame rate (for example a FPS (frames per second) higher than a pre-determined threshold) on all screens and reaction times, the used computing elements like GPU (graphics processing unit) and CPU (central processing unit) may be expensive and consume a considerable amount of electric power. As more and more content, animation and advertising is hosted in the cloud and streamed live to the local HMI system, also background data bandwidth consumption increases. This may lead to increased cost for CPU, GPU, connectivity bandwidth and the system's power consumption, and in particular may affect pure electrical vehicles.

According to various embodiments, the knowledge on human perception may be combined with the current focus of the human to identify which areas of an HMI are currently in perception focus and therefore need to show highest performance, and which areas are currently just in peripheral perception or not perceived at all and therefore can be operated with reduced performance. For example, information about the current user (for example passenger or driver) status may be determined by using e.g. in cabin cameras or in cabin radar, which may also be used to increase functional safety and user convenience. This information may be used to assign or balance the computing power to the user's current needs and focus. This may apply for single users but also for multiple simultaneous users of the computing system (for example for a driver and the other occupants of a car).

FIG. 1 shows a computing system 100 according to various embodiments. The computing system 100 may include a computation unit 102, one or more graphics displays 122 (for example a plurality of TFT (thin film transistor) displays), a driver/face camera 118 (which may be directed to a driver, for example to the driver's head or the driver's face) and one or more cabin/person cameras 120

(which may be directed to the other occupants, for example to their heads or their faces). A graphics processing unit (GPU) 112 may drive the one or more graphics displays 122. It will be understood that although FIG. 1 is described with reference to graphics displays, any other HMI may be controlled with the computing system 100, for example speakers or tactile outputs or inputs. A focus based computing unit 104 may carry out the method according to various embodiments to determine the energy and/or resource utilization related settings based on the level of attention, and may receive input from an eye gaze and user monitoring unit 114 (which may also be referred to as user monitoring unit 114). The eye gaze and user monitoring unit 114 may determine an eye positioning of the driver and/or of the other occupants based on input received from the driver/face camera 118 and/or the one or more cabin/person cameras 120. The focus based computing unit 104 may control energy and/or resource utilization related setting of the GPU 112, of a HMI manager control unit 110, of an application processing unit 108, and of a cloud/online control unit 106. The cloud/online control unit 106 may communicate (for example over the internet, for example to other vehicles or to a central vehicle control station) via a wireless interface 116.

The focus based computing unit 104 may carry out the method according to various embodiments of dynamically assigning computing power to the area of focus of one or more users (for example occupants of a vehicle), for example by using a camera and radar based eye-gaze (acquired for example by user monitoring unit 114) to identify on which portion of the HMI, for example on which special screen, the user(s) is (are) looking currently, and reducing the performance of the all other HMI elements (for example all other display screens) that are currently not in direct focus. The method may be provided as additional software module within the computing system 100 (for example in the focus based computing unit 104).

The HMI performance may be reduced by lowering the frame rate (in FPS) on which the GPU delivers the final calculated frame. The HMI performance may be reduced by lowering the pixel resolution on which the GPU delivers the final calculated frame. A final graphical filter or GPU shader may be applied to get a smooth up-scale done again back to the native TFT resolution, so that for a user, the display still looks pleasing. The HMI performance may be reduced by communication with the software application (for example in application processing unit 108) so that content updates, animations and advertisements may be performed more seldom, which may reduce the energy consumption of the software application. The HMI energy consumption (and also the HMI performance) may be reduced by using simplified GPU shaders for picture improvements and anti-aliasing.

The HMI performance may be reduced by reducing the display backlight and increasing the brightness of the video signal to get an identical brightness perception from the screen but with reduced contrast/details, which are not perceived when not in focus.

Based on the one or more user's eye gaze projection, the gradient focus may be determined, and each display or graphical surface may be assigned a computing power (or a maximum level of energy consumption) according to their total focus level. For example, a display which receives partial attention of several occupants may be operated at high energy settings while a display that receives partial attention of one occupant only may be set to a setting of reduced power consumption.

One or more further sensors 124 may provide input to the user monitoring unit 114.

According to an embodiment, the further sensor(s) 124 may be a distance sensor (for example radar sensor, lidar sensor, ultrasound sensor, or infrared sensor) and may determine the distance of the users to the displays to determine the needed pixel resolution.

According to an embodiment, the further sensor(s) 124 may determine the spatial localization of user compared to the displays and objects in the room to determine if one or more displays of the HMI is in sight.

According to an embodiment, the further sensor(s) 124 may determine the individual eyesight of the users (for example by an input from the user) to adjust the focus level regarding resolution and peripheral perception capability.

According to an embodiment, the further sensor(s) 124 may be a radar sensor for surveying the vehicle cabin or the surrounding area to localize the users spatially.

According to an embodiment, the further sensor(s) 124 may determine other positioning or localization inputs like pedestrian localization services, for example via smartphone or SmartTags.

According to an embodiment, the further sensor(s) 124 may be a light sensitive sensor (for example photo diode or photo cell) and may determine an external light situation (so that for example sunlight influence may be provided as an additional input factor to the energy and/or resource utilization related setting.

According to an embodiment, the further sensor(s) 124 may be a microphone and may provide speech analytics. For example, needs of the users (for example passengers) may be determined based on questions like "What time is it?" or "When will we arrive at home?" that the users ask, and this information may be used to predict that a specific display content will be in focus within the next seconds (like the vehicle time or the navigation with trip time for the two exemplary questions).

It will be understood that even though various aspects of FIG. 1 are described with respect to a vehicle, the devices and methods according to various embodiments may be provided to any kind of human-machine interface, and the user of the human-machine interface may be any user and does not necessarily have to be the occupant of a vehicle.

FIG. 2 shows an eye visus/focus diagram 200. A horizontal axis 204 represents a direction of gaze (wherein the angles towards the right indicate an inside direction, and the angles towards the left indicate an outside direction). A vertical axis 206 illustrates the visus. The diagram 200 illustrates the relative acuity 202 of the human eye on the horizontal meridian in degrees of visual angle from foveal vision. The blind spot 208 is at about 18° in the outside direction (e.g. in the left visual field for the left eye). The diagram depends on users and age and may be personalized.

According to an embodiment, the user may provide information related to his individual eyesight (for example by an input from the user) to adjust the focus level regarding resolution and peripheral perception capability.

According to various embodiments, based on the user head movement or estimated head movement (which may be a spatial estimation or a physical estimation), the assignment of computational power or energy consumption may be more precise or operate with a more efficient temporal utilization related setting or work with less quality/safety margin.

Based on the user drowsiness, the assignment may be adjusted as a drowsy user may not perceive full performant HMI even when in his focus as his focus may generally be reduced. Based on the user falling into sleep detection, the assignment of computational power and/or energy consumption may be adjusted.

Based on sunlight influence, the backlight/contrast may be assigned as with direct sunlight on screen the high contrast view may not be reached anyway and it may be more important that the display is brighter.

The HMI performance or HMI energy consumption may also be reduced by considering the vehicle's battery power status to extend the overall system operation range.

Based in the user's focus (or head position), some visual systems, for example, a head up display (HUD), may be completely put to power-safe (or switched off).

Based on the user's focus (or head position), the cabin audio system may be adjusted to improve the quality of the perceived sound for single or multiple users and/or to highlight the sound information of that area where the user is focusing on (for example, when a driver is looking onto the mileage clock, the system may output the mileage data via spoken words; for example, when a driver is looking onto the navigation system, the system may prompt the traffic and travel situation with speech; for example, when a user is focusing on a movie, the user may get the movie sound).

According to various embodiments, various input data may be received and used to determine the current perception and focus situation for a multi user-multi-display HMI scenarios. Properties (for example operating parameters) of various output devices may be set to optimize the total system resource utilization versus perception. A flexible combination and optional usage of inputs and setting options may be provided.

According to various embodiments, the number of users (for example of an AMOD (Autonomous Mobility on Demand), for example an eAMOD (electric AMOD)) may be determined, and it may be determined where the users are located related to one or more displays which can actually be seen by all users (for example all people in a vehicle). This information may be used to feedback to the applications to adjust the content displayed, for example to provide individual advertisings and/or to ensure that all people have seen important information and/or to protect privacy by only displaying private content when known that only one individual or an individual group has focus on that display.

FIG. 3 shows a flow diagram 300 illustrating a computer-implemented method for energy and/or resource management of a human-machine interface according to various embodiments. In 302, a level of attention of a user of the human-machine interface to the human-machine interface may be determined. In 304, an energy and/or resource utilization related setting of the human-machine interface may be set based on the determined level of attention.

According to various embodiments, the computer-implemented method may further comprise the following step carried out by the computer hardware components: determining a focus point of the user. The level of attention may be determined based on the focus point.

According to various embodiments, the focus point may be determined based on at least one of: a pose of the user's head; or a pose of at least one of the user's eyes.

According to various embodiments, the computer-implemented method may further comprise the following step carried out by the computer hardware components: determining a level of drowsiness of the user. The level of attention may be determined based on the level of drowsiness.

According to various embodiments, the level of drowsiness may be determined based on at least one of: a movement of the user; an eye movement of the user; or a reaction time of the user.

According to various embodiments, the energy and/or resource utilization related setting may comprise or may be a frame rate of a graphics display of the human-machine interface.

According to various embodiments, the energy and/or resource utilization related setting may comprise or may be a pixel resolution on which a graphics processing unit provides a frame to be displayed on a graphics display of the human-machine interface. The HMI performance may be reduced by lowering the pixel resolution on which the GPU needs to deliver the final calculated frame. A final graphical filter or GPU shader may be applied in addition to get a smooth up-scale done again back to the native display resolution.

According to various embodiments, the energy and/or resource utilization related setting may include or may be an intensity of a backlight illumination of a graphics display of the human-machine interface. In order to compensate for the reduced backlight illumination, the brightness of the graphics data to be displayed on the graphics display may be increased (for example, lighter colors or shades of gray may be used).

According to various embodiments, the energy and/or resource utilization related setting may be related to a pre-processing of data to be displayed on a graphics display of the human-machine interface.

According to various embodiments, the energy and/or resource utilization related setting may be related to acquiring data to be displayed on a graphics display of the human-machine interface.

According to various embodiments, the energy and/or resource utilization related setting may comprise or may be an off state.

According to various embodiments, the energy and/or resource utilization related setting may be set based on a status of a battery of the human-machine interface.

According to various embodiments, the energy and/or resource utilization related setting may comprise or may be an audio-setting of an audio system.

FIG. 4 shows a flow diagram 400 illustrating a method according to an embodiment. At 402, users and their localization may be identified by available sensors or auxiliary data sources (for example smartphone tags, social databases, etc.). At 404, the focus of all users (e.g. by poses and eye gaze and movement estimation) and their level of attention towards the HMI (for example displays and sound outputs) may be determined. At 406, special perception capabilities of the users (e.g. physical condition and drowsiness, sunlight/illumination influence) may be considered and applied. At 408, a list of all focus incidents identified within a scenario may be maintained, and this information may be used at step 414. At 410, HMI System capabilities and available options for the settings (framerate, pixel resolution, backlight power, content control, unit disabling, etc.) for the different physical hardware elements (CPU, network, GPU, displays, sound players) may be considered, and this information may be used at step 414. At 412, energy status, limitations, and/or energy policies may be considered, and this information may be used at step 414. At 414, balanced settings may be determined according to HMI perception policies. At 416, the settings may be executed on (or applied to) the different physical hardware elements (like CPU, network, GPU, displays, and/or sound players).

Each of the steps 302, 304, 402, 404, 406, 408, 410, 412, 414, 416 and the further steps described above may be performed by computer hardware components.

As described above, devices and methods may be provided for power efficiency and dynamical assignment of the computing power on the current focus of the human user, which may allow to reduce the resources needed for graphical HMIs of premium computing systems (or to enhance the user experience of graphical HMIs without increasing the required resources). The devices and methods may enable a user focused resource assignment and may execute (in other words: drive or enable) a HMI only at those areas where the HMI is seen or recognized by the users respectively. The devices and methods may provide a better resource utilization and may save cost and power compared to commonly used techniques and may accordingly deliver better or optimized performance on a given system setup. According to various embodiments, driver perception focus with respect to the HMI may be used to determine computing process focusing.

It will be understood that even though reference to a "threshold" is made for various embodiments, operation may not need to be binary (in the sense of operating in a first operation mode for an input below the threshold and operating in a second operation mode for an input higher than the threshold), but operation may be gradually (for example a smooth transition between the first operating mode and the second operating mode while the input is changing).

What is claimed is:

1. A computer implemented method for energy or resource management of a human-machine interface of a computing system, the method comprising the following steps carried out by computer hardware components of the computing system:
   determining a level of attention of a user to the human-machine interface; and
   setting one or more energy or resource utilization related settings of the human-machine interface based on the determined level of attention, the energy or resource utilization related settings including a rate of acquiring data to be displayed on a graphics display of the human-machine interface.

2. The computer-implemented method of claim 1, further comprising the following step carried out by the computer hardware components:
   determining a focus point of the user, wherein the level of attention is determined based on the focus point.

3. The computer-implemented method of claim 2, wherein the focus point is determined based on at least one of:
   a pose of the user's head; or
   a pose of at least one of the user's eyes.

4. The computer-implemented method of claim 1, further comprising the following step carried out by the computer hardware components:
   determining a level of drowsiness of the user, wherein the level of attention is determined based on the level of drowsiness.

5. The computer-implemented method of claim 4, wherein the level of drowsiness is determined based on at least one of:
   a movement of the user;
   an eye movement of the user; or
   a reaction time of the user.

6. The computer-implemented method of claim 1, wherein the energy or resource utilization related settings further include a frame rate of a graphics display of the human-machine interface.

7. The computer-implemented method of claim 1, wherein the energy or resource utilization related settings further include a pixel resolution including a level of graphical details on which a graphics processing unit of the computing system is configured to provide a frame to be scaled and displayed on a physical graphics display of the human-machine interface.

8. The computer-implemented method of claim 1, wherein the energy or resource utilization related settings further include an intensity of a backlight illumination of a graphics display of the human-machine interface.

9. The computer-implemented method of claim 1, wherein the energy or resource utilization related settings further include an amount of pre-processing of data to be displayed on a graphics display of the human-machine interface.

10. The computer-implemented method of claim 1, wherein the setting of the energy or resource utilization related settings is further based on a status of a battery of the human-machine interface.

11. The computer-implemented method of claim 1, wherein the energy or resource utilization related settings further include an audio-setting of an audio system.

12. The computer-implemented method of claim 1, wherein the setting the energy or resource utilization related settings comprises, responsive to the determined level of attention being below a threshold, setting the rate of acquiring data to a lower rate.

13. A computer system comprising a human-machine interface and computer hardware components configured to:
   determine a level of attention of a user to the human-machine interface; and
   set one or more energy or resource utilization related settings of the human-machine interface based on the determined level of attention, the energy or resource utilization related settings including a rate of acquiring data to be displayed on a graphics display of the human-machine interface.

14. The computer system of claim 13, wherein the computer hardware components are further configured to:
   determine a focus point of the user; and
   determine the level of attention based on the focus point.

15. The computer system of claim 14, wherein the computer hardware components are further configured to determine the focus point based on at least one of:
   a pose of the user's head; or
   a pose of at least one of the user's eyes.

16. The computer system of claim 13, wherein the computer hardware components are further configured to:
   determine a level of drowsiness of the user; and
   determine the level of attention based on the level of drowsiness.

17. The computer system of claim 16, wherein the computer hardware components are further configured to determine the level of drowsiness based on at least one of:
   a movement of the user;
   an eye movement of the user; or
   a reaction time of the user.

18. The computer system of claim of claim 13, wherein the energy or resource utilization related setting comprises settings further include at least one of:
   a frame rate of a graphics display of the human-machine interface;

a pixel resolution;

an intensity of a backlight illumination; or an audio-setting of an audio system.

19. The computer system of claim 13, wherein the computer hardware components are further configured to:

responsive to the determined level of attention being below a threshold, set the rate of acquiring data to a lower rate.

20. A non-transitory computer readable medium comprising instructions that when executed configure a computer system to:

determine a level of attention of a user to a human-machine interface of the computing system; and set one or more energy or resource utilization related settings of the human-machine interface based on the determined level of attention, the energy or resource utilization related settings including a rate of acquiring data to be displayed on a graphics display of the human-machine interface.

* * * * *